United States Patent [19]

Yamashita

[11] Patent Number: 4,555,984
[45] Date of Patent: Dec. 3, 1985

[54] COFFEE MAKER

[75] Inventor: Kiyoshi Yamashita, Aichi, Japan

[73] Assignee: Tokyo Shibaura Denki Kabushiki Kaisha, Kawasaki, Japan

[21] Appl. No.: 495,490

[22] Filed: May 17, 1983

[30] Foreign Application Priority Data

| May 19, 1982 [JP] | Japan | 57-85528 |
| Sep. 2, 1982 [JP] | Japan | 57-133485[U] |
| Sep. 16, 1982 [JP] | Japan | 57-140347[U] |
| Oct. 9, 1982 [JP] | Japan | 57-154242[U] |
| Nov. 29, 1982 [JP] | Japan | 57-181147[U] |

[51] Int. Cl.⁴ .................................. A47J 31/42
[52] U.S. Cl. .................................. 99/286; 99/307; 241/101.2; 241/282.1
[58] Field of Search ............... 99/279, 286, 295, 300, 99/304, 307; 241/101.2, 258, 282.1, 282.2

[56] References Cited

U.S. PATENT DOCUMENTS

| 4,172,413 | 10/1979 | Roseberry | 99/286 |
| 4,196,658 | 4/1980 | Takagi | 99/286 |
| 4,406,217 | 9/1983 | Oota | 99/286 |
| 4,431,028 | 2/1984 | Hendrick | 251/208 |

FOREIGN PATENT DOCUMENTS

| 372834 | 4/1983 | Austria . | |
| 2330078 | 1/1974 | Fed. Rep. of Germany | 99/286 |
| 835922 | 10/1938 | France | 99/286 |
| 532404 | 5/1967 | France . | |
| 55-113136 | 2/1979 | Japan | 99/286 |
| 55-153022 | 4/1979 | Japan | 99/286 |
| 5668414 | 11/1979 | Japan | 99/286 |
| 563761 | 7/1975 | Switzerland | 99/286 |
| 2063101A | 6/1981 | United Kingdom | 99/286 |
| 2009590 | 2/1982 | United Kingdom | 99/286 |

Primary Examiner—Robert W. Jenkins
Assistant Examiner—Arthur D. Dahlberg
Attorney, Agent, or Firm—Cushman, Darby & Cushman

[57] ABSTRACT

A coffee maker has a main body which has a jug stand and a support portion parallel to the base at a predetermined distance therefrom. A cylindrical jug for storing brewed coffee is placed on the jug stand. A cylindrical extractor is placed on the jug. A cylindrical mill case for storing coffee beans is detachably mounted on the support portion to be located above the extractor. A motor is mounted on the support portion and housed in the mill case. A cutter is mounted on a rotating shaft of the motor and located in the mill case. The cutter is driven by the motor to grind coffee beans in the mill case. The mill case has a supply port facing the extractor through which the coffee ground in the mill case is supplied to the extractor. The mill case, extractor, and jug are vertically aligned to be coaxial with each other.

21 Claims, 15 Drawing Figures

F I G. 9
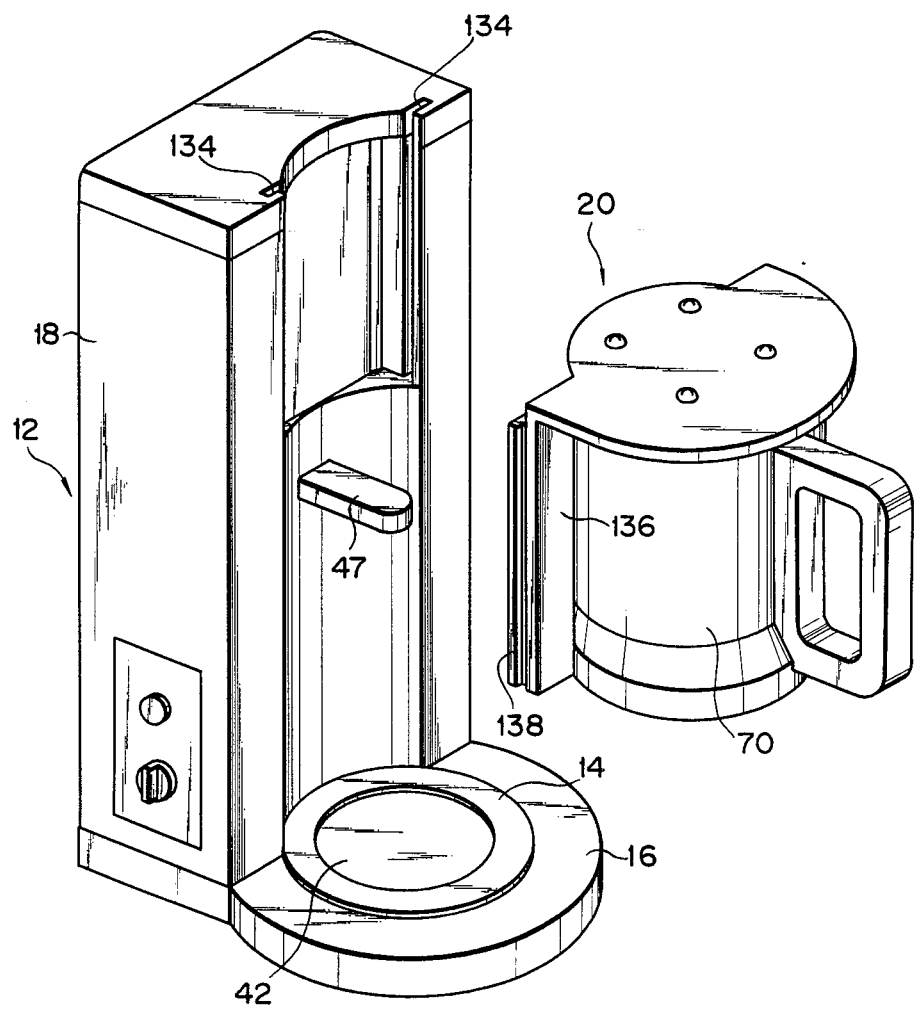

F I G. 15
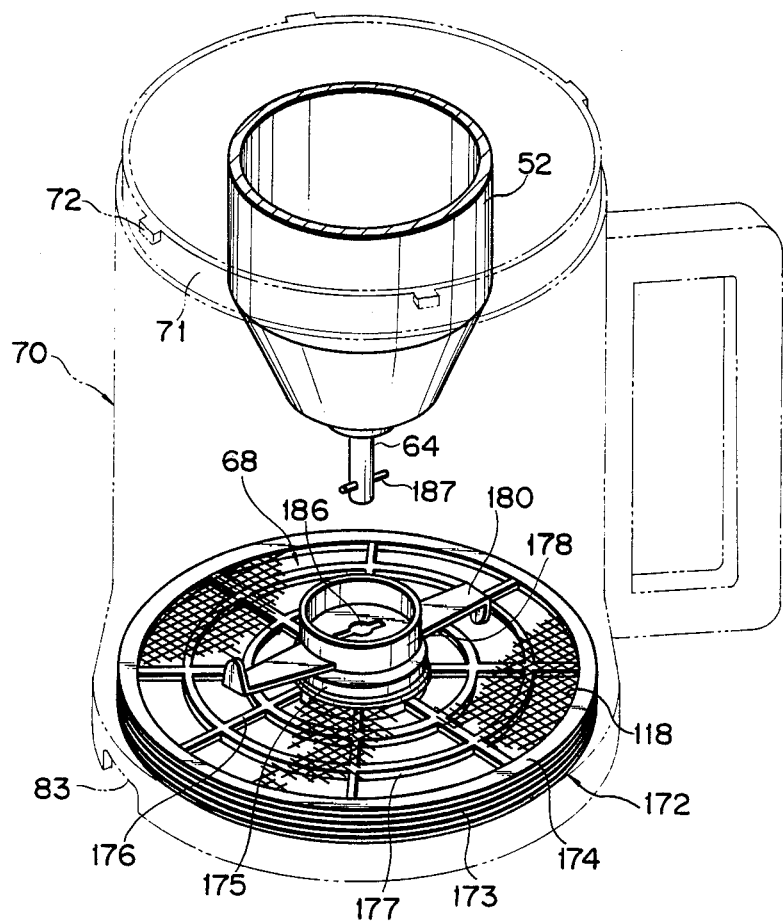

COFFEE MAKER

BACKGROUND OF THE INVENTION

The present invention relates to a coffee maker and, more particularly, to a coffee maker having a mill mechanism wherein coffee is ground by the mill mechanism and hot water from a hot water supply mechanism is supplied to the ground coffee to extract brewed coffee therefrom.

There are two types of conventional coffee makers having such a mill mechanism. The first type of conventional coffee maker comprises a main body, a motor housing, and a jug stand. The motor housing and the jug stand are disposed at two sides of the lower portion of the main body. A mill motor is housed in the motor housing. A case housing is formed above the motor housing. A coffee mill/extraction case is disposed in the case housing. When the user wishes to make coffee, he places coffee beans in the coffee mill/extraction case and starts the motor, so that the coffee beans are ground by a cutter mounted on a rotating shaft of the motor. Hot water is then supplied from a hot water supply mechanism disposed in the main body to the coffee mill/extraction case, thereby extracting brewed coffee. The brewed coffee is then stored in a jug placed on the jug stand.

The second type of conventional coffee maker comprises a main body, a motor housing and a jug stand. The motor housing and the jug stand are disposed at two sides of the lower portion of the main body. A mill case is detachably disposed above the motor housing. When the user wishes to make coffee, he places coffee beans in the mill case so as to mill them by a cutter driven by a motor. The user then removes the mill case and puts the ground coffee in a coffee extractor above a jug which is placed on the jug stand. Hot water is then supplied from a hot water supply mechanism, thereby making coffee.

However, in the above conventional coffee makers, the jug stand and the motor housing, each having a large diameter, are disposed adjacent to each other below the main body. Both types of coffee maker thus have a large overall size and occupy a large space.

A coffee maker is disclosed in Japanese Patent Disclosure No. 56-68414 wherein a jug, a coffee extractor and a mill case are disposed along the height of the coffee maker and a motor is housed in the mill case. This coffee maker has a compact size and occupies a smaller space, thereby solving the problems of both the first and second conventional types of coffee maker. However, according to the coffee maker disclosed in Japanese Patent Disclosure No. 56-68414, the mill case is not detachably disposed with respect to the main body, and the motor is not fixed on the main body. Thus, the mill case cannot be removed from the main body to be cleaned, which means that old ground coffee is left in the mill case, thereby degrading the taste of subsequently brewed coffee and adversely affecting the motor. Furthermore, since the motor is not mounted on the main housing, the motor vibrates noisily during its operation.

SUMMARY OF THE INVENTION

The present invention has been made in consideration of the conventional drawbacks, and has for its object to provide a compact coffee maker which requires a small occupying space, which stably supports a motor and from which a mill case can be easily removed.

According to an aspect of the present invention, there is provided a coffee maker comprising: a main body having a base for forming a jug stand, a straight portion extending from the base to be substantially perpendicular to the base, and a support portion extending from the straight portion and spaced apart from the base at a predetermined distance to be substantially parallel to the base; a jug for storing brewed coffee, being placed on the jug stand; an extractor placed on the jug; a mill case for storing coffee beans, being detachably mounted on the support portion to be located above the extractor; a motor mounted on the support portion and housed in the mill case to define a milling space with an inner surface of the mill case; a cutter arranged in the milling space, the cutter being driven by the motor to grind coffee beans in the mill case, the mill case having a dispensing port opposing the extractor through which the coffee ground in the mill case is supplied to the extractor; a water tank for storing water, being mounted in the main body; and hot water supplying means, disposed in the main body, for heating the water in the water tank and for supplying hot water to the extractor.

According to the coffee maker of the present invention, the motor is housed in the mill case. Furthermore, the mill case, the extractor, and the jug are disposed vertically in a so-called tandem arrangement. For these reasons, the coffee maker does not require a separate motor housing which is conventionally disposed adjacent to the jug stand, thereby providing a compact coffee maker which requires a small occupying space. Therefore, this coffee maker can be conveniently placed on a narrow table, counter or the like. Furthermore, since the mill case is detachably mounted on the main body, it can be removed from the main body to be cleaned. Therefore, old ground coffee left in the mill case can be easily removed. As described above, the motor is stably mounted on the main body, thereby preventing vibration during operation and eliminating noise.

BRIEF DESCRIPTION OF THE DRAWINGS

FIGS. 1 to 3 illustrate a coffee maker according to a first embodiment of the present invention, in which FIG. 1 is a longitudinal sectional view thereof, FIG. 2 is a perspective view of a reinforcing frame thereof, and FIG. 3 is a perspective view of a motor and a mill case thereof;

FIGS. 5 to 8 illustrate a coffee maker according to a second embodiment of the present invention, in which FIG. 5 is a longitudinal sectional view thereof, FIG. 6 is a longitudinal sectional view thereof showing the state in which a mill case is pivoted from the position shown in FIG. 5, FIG. 7 is an exploded perspective view thereof, and FIG. 8 is an enlarged perspective view showing the essential part thereof;

FIG. 9 is an exploded perspective view showing a modification of the main body shown in FIGS. 5 to 8;

FIGS. 10 and 11 illustrate a first modification of the mill case, in which FIG. 10 is a perspective view of the mill case and a motor, and FIG. 11 is an enlarged sectional view showing the essential part thereof;

FIGS. 12 and 13 illustrate a second modification of the main case, in which FIG. 12 is a longitudinal sectional view of a coffee maker, and FIG. 13 is a perspective view of the mill case and a motor; and FIGS. 14 and 15 illustrate a modification to explain the mounting method of a cutter, in which FIG. 14 is a longitudinal sectional view of a coffee maker, and FIG. 15 is a perspective view of a mill case.

DETAILED DESCRIPTION OF THE PREFERRED EMBODIMENTS

Preferred embodiments of the present invention will be described with reference to the accompanying drawings.

Figure 1:
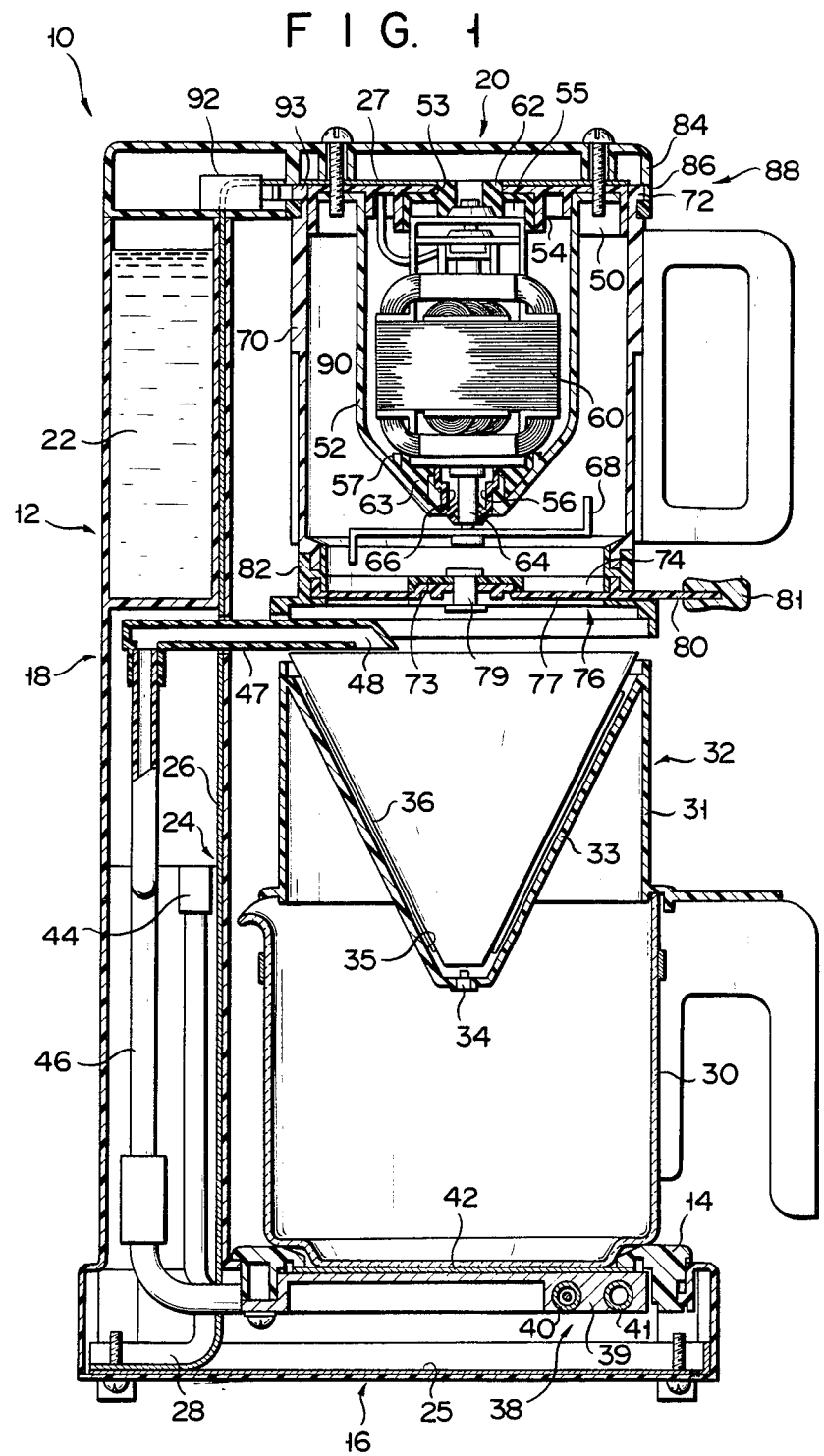
Figure 2:
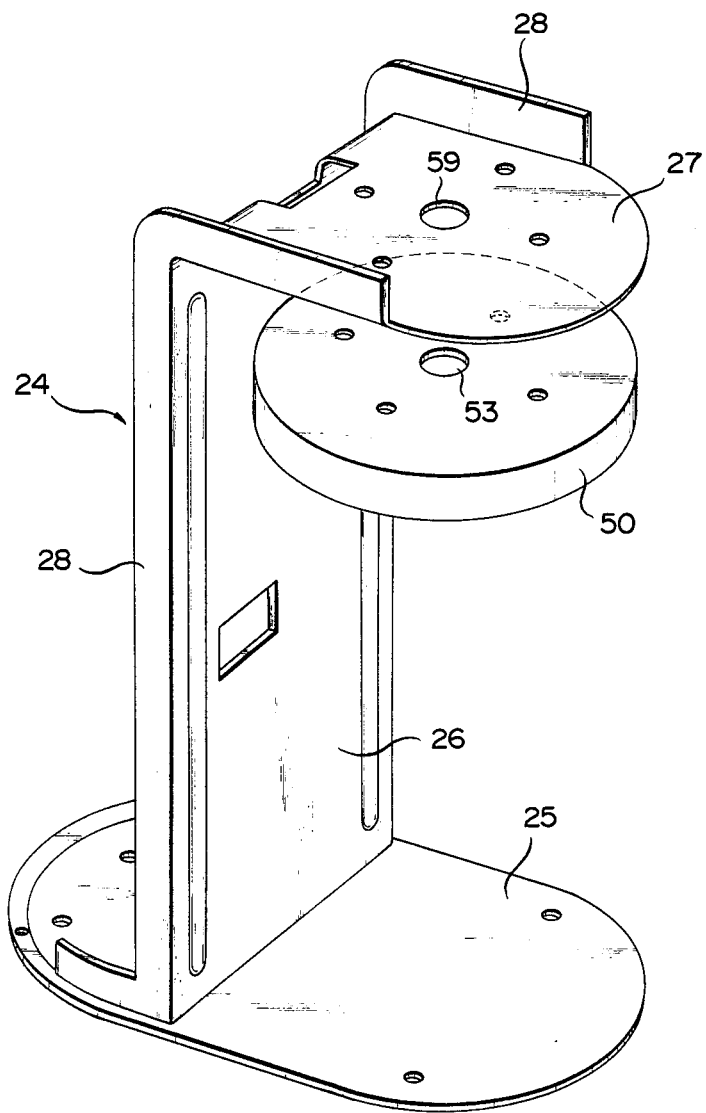
Figure 3:
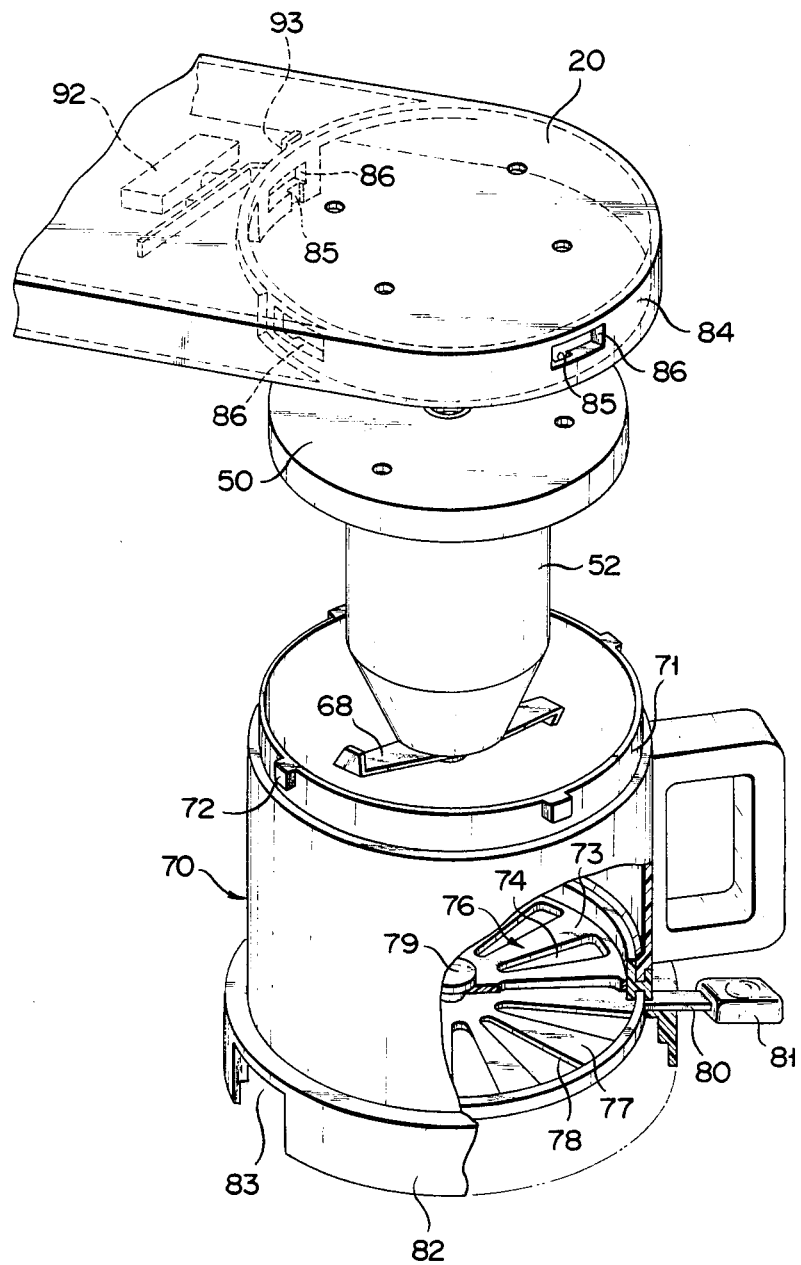

FIGS. 1 to 3 illustrate a coffee maker according to a first embodiment of the present invention. Referring to FIG. 1, a coffee maker 10 comprises a plastic main body 12. The main body 12 has a base 16 for forming a jug stand 14, a straight portion 18 perpendicularly extending from the base 16; and a support portion 20 extending horizontally from the straight portion 18. The support portion 20 is spaced apart from the base 16 by a predetermined distance and is substantially parallel to the base 16. The main body 12 has a substantially recessed longitudinal section. The coffee maker 10 has a thin, elongated water tank 22 formed integrally with the straight portion 18. The water tank 22 constitutes part of the main body 12. The main body 12 is reinforced by a reinforcing frame 24, as shown in FIGS. 1 and 2. The reinforcing frame 24 has a metal base stand 25 which has a substantially elliptical shape; and a metal support plate 26 extending perpendicular to the base stand. The extended end portion of the support plate 26 is bent to be perpendicular to the support plate, thus forming a top plate 27 which is parallel to the base stand 25. The two sides of the vertical support plate 26 are bent to be substantially perpendicular to the support plate so as to form flanges 28 for reinforcing the frame 24.

The coffee maker 10 also has a cylindrical jug 30 with a bottom and a filter case 32. The jug 30 is placed on the jug stand 14. The filter case 32 serves as a coffee extractor placed on a top opening portion of the jug 30. The filter case 32 has a cylindrical extractor main body 31 and a filtration funnel 33. The filtration funnel 33 extends downward from the top opening edge of the extractor main body 31. The lower end portion of the filtration funnel 33 extends inside the jug 30 through the top opening portion thereof. The filtration funnel 33 has a coffee extraction port 34 formed in the lower end thereof and a plurality of ribs 35 radially extending from the port along the inner surface thereof. A paper filter 36 is detachably placed on the inner surface of the filtration funnel 33.

The coffee maker 10 also has a hot water supplying means 38 disposed in the main body 12. The hot water supplying means serves to heat water in the water tank 22 to supply hot water to the filter case 32. The hot water supply means 38 has a heating plate 39, a sheath heater 40, a heating tube 41, and a heat conduction plate 42. The heating plate 39 is disposed in the base 16. The sheath heater 40 and the heating tube 41 are embedded in the heating plate 39 to be parallel to each other. The heat conduction plate 42 is disposed in tight contact with the heating plate 39 and forms a bottom surface of the jug stand 14. One end of the heating tube 41 extends upward through the straight portion of the main body 12 and is connected to a water discharge port 45 of the water tank 22 through a check valve 44. The hot water supplying means 38 has a hot water supply tube 46 extending upward from the other end of the heating tube 41 through the straight portion 18, and a hot water supply arm 47 extending from the extended end of the hot water supply tube 46 to the outside of the main body 12. The hot water supply arm 47 has a hot water supply port 48 located above the filter case 32.

A disc-shaped cover 50 and a motor case 52 are mounted on the support portion 20 of the main body 12. The cover 50 and the motor case 52 are screwed to the lower surface of the top plate 27 of the reinforcing frame 24. The cover 50 has a central through hole 53 and a cylindrical projection 54 around the central through hole 53 to extend downward from the lower surface of the top plate 27. An elastic member fitting recess 55 is defined by the cylindrical projection 54. The motor case 52 has a cylindrical shape and is tapered toward its distal end. The motor case 52 is screwed to the lower surface of the top plate 27 through the cover 50 to be coaxial with the cover 50. The motor case 52 has a through hole 56 for receiving the motor rotating shaft therethrough, the through hole being formed in the lower or tapered end of the motor case, and a cylindrical projection 57 which is located to surround the through hole 56 and which extends upward. The projection 57 defines an elastic member fitting recess 58. A through hole 59 is formed in the top plate 27 and is coaxial with the through hole 53 of the cover 50.

A motor 60 is arranged in the motor case 52. The motor 60 is supported on the cover 50 and the motor case 52 through elastic members 62 and 63 which are respectively fitted in the elastic member fitting recesses 55 and 58. A rotating shaft 64 of the motor 60 extends downward through the through hole 56. A seal member 66 is fitted in the space between the rotating shaft 64 and the through hole 56. A cutter 68 is screwed to the extended end of the rotating shaft 64.

Furthermore, the coffee maker 10 has a cup-shaped or cylindrical mill case 70 which is detachably supported on the support portion 20, as shown in FIGS. 1 and 3. The mill case 70 has a small-diameter portion 71 at its upper end portion. A plurality of projections 72 (four in this embodiment) are formed on the upper peripheral surface of the small-diameter portion 71 at equal intervals. The lower opening of the mill case 70 is closed by a disc-shaped bottom plate 73. A plurality of dispensing ports 74 are formed in the bottom plate 73 to radially extend from the center thereof. The mill case 70 has an opening/closing means 76 for opening/closing the dispensing ports 74. The opening/closing means 76 has a rotary plate 77 pivotally mounted on the bottom plate 73 so as to be adjacent to the lower surface of the bottom plate and oppose it. The rotary plate 77 has substantially the same size as that of the bottom plate 73 and has a plurality of through holes 78 radially formed therein and extending from the center thereof. The through holes 78 have substantially the same shape as that of the dispensing ports 74. The rotary plate 77 is pivotally supported on a shaft 79 fixed at the center of the bottom plate 73. Furthermore, the rotary plate 77 has a control lever 80 radially extending outward from the periphery thereof, and a knob 81 mounted on the distal end of the control lever 80. When the operator moves the lever 80 so as to pivot the rotary plate 77 through a predetermined angle, the through holes 78 are set either at an open position where they are aligned with the dispensing ports 74 or at a closed position where they are offset from the dispensing ports 74. A cylindrical cover 82 is coaxially fitted in the lower end of the mill case 70. The cover 82 surrounds the rotary plate 77. The cover 82 has a notch 83 which opens downward.

The support portion 20 of the main body 12 has a cylindrical support body 84 which may be fitted with the small-diameter portion 71 of the mill case 70. Four grooves 85 and four elongated holes 86 are formed in the inner surface of the support body 84. The grooves 85 extend upwards from the lower edge of the support body 84. The elongated holes 86 are formed extending from the upper ends of the grooves 85 along the circumferential direction of the inner surface of the support body 84. Each pair of grooves 85 and elongated holes 86 corresponds to and is fitted with each projection 72 of the mill case 70. Referring to FIGS. 1 and 3, the left half of the cylindrical support body 84 is partially notched except for the portions each of which has the pair of grooves 85 and elongated holes 86. The left half of the support body 84 extends downward to the top plate 27 of the reinforcing frame 24. Each pair of grooves 85 and elongated holes 86 is located below the top plate 27. The mill case 70 is detachably mounted on the support portion 20 of the main body 12 such that the small-diameter portion 71 may be inserted from the lower side in the support body 84 so as to respectively fit the projections 72 in the grooves 85, and such that the mill case 70 may be pivoted so as to respectively engage the projections 72 with the elongated holes 86. The projections 72, the grooves 85 and the elongated holes 86 constitute a mounting means 88 for detachably mounting the mill case 70 on the support portion 20.

When the mill case 70 is mounted on the support portion 20, the motor case 52 together with the motor 60 are housed in the mill case 70. The mill case 70 is disposed to be coaxial with the motor case 52. A milling space 90 is defined between the inner surface of the mill case 70 and the motor case 52. The cutter 68 is positioned in the milling space 90. The bottom plate 73 and the dispensing ports 74 of the mill case 70 are located adjacent to and facing the upper opening portion of the filter case 32. The hot water supply arm 47 extends between the mill case 70 and the filter case 32 extending through the notch 83 of the cover 82. The jug 30, the filter case 32, the mill case 70 and the motor 60 are coaxial with each other and are vertically disposed along the height of the coffee maker 10.

The coffee maker 10 has a safety switch 92 arranged in the support portion 20 of the main body 12. The safety switch 92 is connected in series with a manual switch (not shown) in an energization path of the motor 60. The safety switch 92 has an operation knob 93 which includes a leaf spring inserted in one of the elongated holes 86 of the support body 84. When the mill case 70 is properly set in the support portion 20 and the operation knob 93 is urged by the projection 72 fitted in the corresponding elongated hole 86, the operation knob 93 is deflected so as to turn on the safety switch 92. Therefore, the motor 60 can be energized only when the mill case 70 is properly mounted on the support portion 20. It should be noted that the manual switch is switched between a mill operating position in which the motor 60 is energized and a hot water supply position in which the sheath heater 40 of the hot water supplying means 38 is energized.

The operation of the coffee maker 10 having the structure described above will be described hereinafter.

If the user wishes to make coffee, he takes out the filter case 32 together with the jug 30 from the jug stand 14. Thereafter, the user removes the mill case 70 from the support portion 20 and moves the lever 80 to pivot the rotary plate 77 which then closes the dispensing ports 74 of the mill case 70. The user then places a desired amount of coffee beans in the mill case 70 and puts the mill case 70 on the motor case 52 from the lower side thereof. At the same time, the projections 72 are inserted in the grooves 85 of the support body 84, respectively, while the hot water supply arm 47 is loosely fitted in the notch 83. The mill case 70 is then pivoted to respectively engage the projections 72 with the elongated holes 86, thus properly mounting the mill case 70 on the support portion 20. At the same time, the operation knob 93 of the safety switch 92 is urged by the corresponding projection 72 of the mill case 70, so that the safety switch 92 is turned on. The motor 60 can then be energized. The user places a paper filter 36 in the filtration funnel 33, and places the jug 30 together with the filtration funnel having the paper filter 36 therein on the heat conduction plate 42 of the jug stand 14. A predetermined amount of water is then manually supplied from a water supply port (not shown) to the water tank 22. Thereafter, the user sets the manual switch to the mill operating position, thereby energizing the motor 60. The cutter 68 is driven to mill the coffee beans in the mill case 70. The ground coffee tends to be urged toward the peripheral portion of the upper side of the cutter because of the rotation of the cutter 68 during the milling of the coffee beans, and is thus distributed in the peripheral portion of the bottom part of the mill case 70. For this reason, even if the motor case 52 is disposed in the mill case 70, it will not adversely affect milling of the coffee beans. After the coffee beans are milled, the user turns off the manual switch, thereby stopping the motor 60. The user moves the lever 80 to pivot the rotary plate 77 so as to open the dispensing ports 74 of the mill case 70, so that the ground coffee in the mill case 70 drops onto the paper filter 36 in the filtration funnel 33 through the dispensing ports 74. The user then sets the manual switch to the hot water supply position. The sheath heater 40 of the hot water supplying means 38 is energized to be heated. Heat from the sheath heater 40 is conducted to the jug 30 through the heating plate 39 and the heat conduction plate 42, so that the jug is preheated. At the same time, heat from the sheath heater 40 is conducted to the heating tube 41 through the heating plate 39 so as to heat water supplied from the water tank 22 thereto. Hot water rises through the hot water supply tube 46 due to its boiling pressure. The hot water then drips from the hot water supply port 48 of the hot water supply arm 47 onto the ground coffee in the paper filter 36. The hot water passes through the ground coffee and the paper filter 36 and is extracted as brewed coffee. This brewed coffee drips into the jug 30 through the extraction port 34 and is stored therein. When coffee making is completed, the user removes the filter case 32 together with the jug 30 from the jug stand 14. He removes the filter case 32 from the jug 30, and may then serve the brewed coffee from the jug into coffee cups. The old ground coffee in the filter case 32 is thrown away together with the paper filter 36.

According to the coffee maker 10 having the structure of the embodiment described above, the mill case 70 is mounted on the support portion 20 of the main body 12. The motor case 52 which has the motor 60 therein is disposed within the mill case 70 and together therewith defines the milling space 90. The coffee maker 10 does not therefore require a separate motor housing conventionally disposed adjacent to the jug stand. Furthermore, the mill case 70, the filter case 32 and the jug 30 are vertically disposed along the height of the coffee maker 10 (i.e., so-called tandem arrangement). Therefore, the coffee maker 10 is compact in size and occupies only a small surface area. Accordingly, the coffee maker 10 can be easily placed on a narrow table or the like.

The mill case 70 is detachably mounted via the mounting means 88 on the support portion 20 of the main body 12. For this reason, the mill case 70 can be removed from the main body 12, so that both the mill case 70 and the cutter 68 can be cleaned. As a result, any old ground coffee left on the inside of the mill case and the cutter can be easily removed. The motor 60 is mounted and supported on the support portion 20 of the main body 12 through the elastic members 62 and 63. Therefore, the motor 60 is stably supported on the main body 12, thereby eliminating annoying vibration and noise of the motor 60. Furthermore, since the seal member 66 is fitted between the rotating shaft 64 of the motor 60 and the through hole 56, neither ground coffee nor water may enter the motor case 52. If the dispensing ports 74 of the mill case 70 are closed by the rotary plate 77 during coffee extraction, an inflow of water into the motor case 52 is more securely prevented. For this reason, the motor 60 itself need not be sealed, so that a simple and inexpensive motor 60 can be used. As a result, an inexpensive coffee maker can be obtained whose service life is prolonged and whose reliability is greatly improved.

The mill case 70 has the dispensing ports 74 and the opening/closing means 76 for opening/closing the dispensing port 74. For this reason, without removing the mill case 70 from the main body 12, the ground coffee in the mill case 70 can be transferred to the filter case 32 upon operation of the lever 80, thereby simplifying the transfer operation of the ground coffee.

The main body 12 is entirely reinforced by the reinforcing frame 24 from the base 16 to the support portion 20. For this reason, even if the relatively heavy motor 60 and the mill case 70 are mounted on the support portion 20, the main body 12 will not be deformed by their weight, even after being in use for a long period of time.

The coffee maker 10 further has a safety switch 92. The motor 60 may be driven only when the mill case 70 is properly mounted. In other words, when the mill case 70 is not properly mounted on the support portion 20 (i.e., when the cutter 68 is exposed to the atmosphere), the motor 60 may not be driven, thereby ensuring safety during operation.

Figure 4:
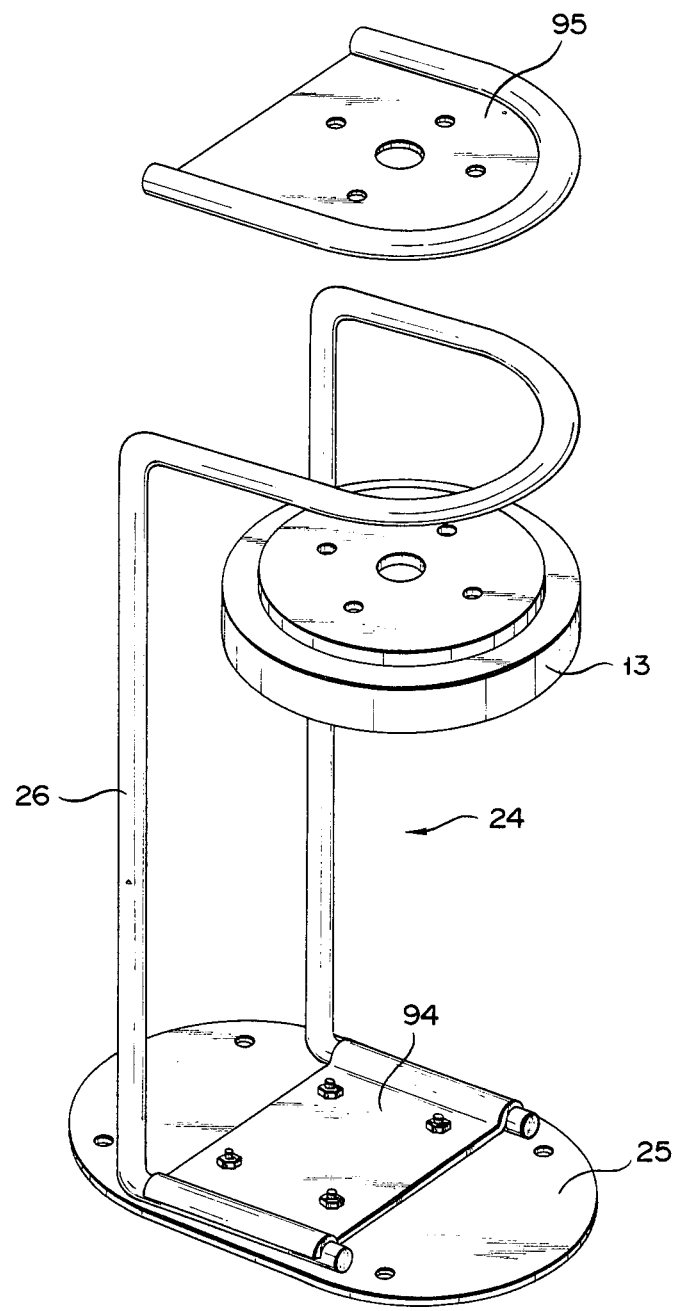
FIG. 4 is a perspective view showing a modification of the reinforcing frame shown in FIG. 2.

In the first embodiment described above, the reinforcing frame 24 is made of a metal plate, but may have the alternative arrangement shown in FIG. 4. The reinforcing frame 24 in FIG. 4 comprises: a base stand 25 having a substantially elliptical shape; and a U-shaped support body 26 erected on the base stand 25 and made by bending a metal rod. The lower portion of the U-shaped support body 26 is bent perpendicular to the vertical portion thereof. The lower portion is clamped between the base stand 25 and a press plate 94 bolted onto the base stand 25, and so that the support body 26 is fixed on the base stand 25. The upper portion of the U-shaped support body 26 is bent perpendicular to the vertical portion thereof so as to face the base stand 25. The upper portion of the U-shaped support body 26 is clamped between a cover mounting plate 95 and a cover 13, so that the cover 13 is mounted on the U-shaped support body 26.

A coffee maker according to a second embodiment of the present invention will now be described with reference to FIGS. 5 to 8. The same reference numerals as used in the first embodiment denote the same parts in the second embodiment, and a detailed description thereof will be omitted.

A straight portion 18 of a main body 12 is divided into a first portion 96 perpendicularly extending from the base 16 and a second portion 97 extending vertically upward from the first portion 96. The second portion 97 can pivot with respect to the first portion 96. The support portion 20 of the main body 12 extends horizontally from the distal end of the second portion 97.

A pair of sector-shaped hinges 98 are mounted at the upper end of the first portion 96 so as to be spaced apart from each other by a predetermined distance. Each hinge 98 has an arcuated guide surface 99, first and second engaging recesses 100 and 102 formed in the guide surface 99 to be spaced apart from each other, and a support hole 103. The second portion 97 is pivotally supported on the distal end portion of the first portion 96 by a support shaft 104 inserted in the support holes 103 of the hinges 98. A pair of leaf springs 106 are disposed in the second portion 97. One end of each leaf spring 106 is fixed at the second portion 97 and the other end opposes a corresponding hinge 98. The other end of each leaf spring 106 is bent to form a projection 108 which is selectively engaged one of the first and second engaging recesses 100 and 102. In the state shown in FIG. 5, the projection 108 of each leaf spring 106 engages the first recess 100 of each hinge 98. The second portion 97 is thus held in a first position (upright position). In the state shown in FIG. 6, the projection 108 of each leaf spring 106 engages the second recess 102 of each hinge 98. The second portion 97 is thus held in a second position where the second portion pivots with respect to the first portion 96 through a predetermined angle.

Figure 5:
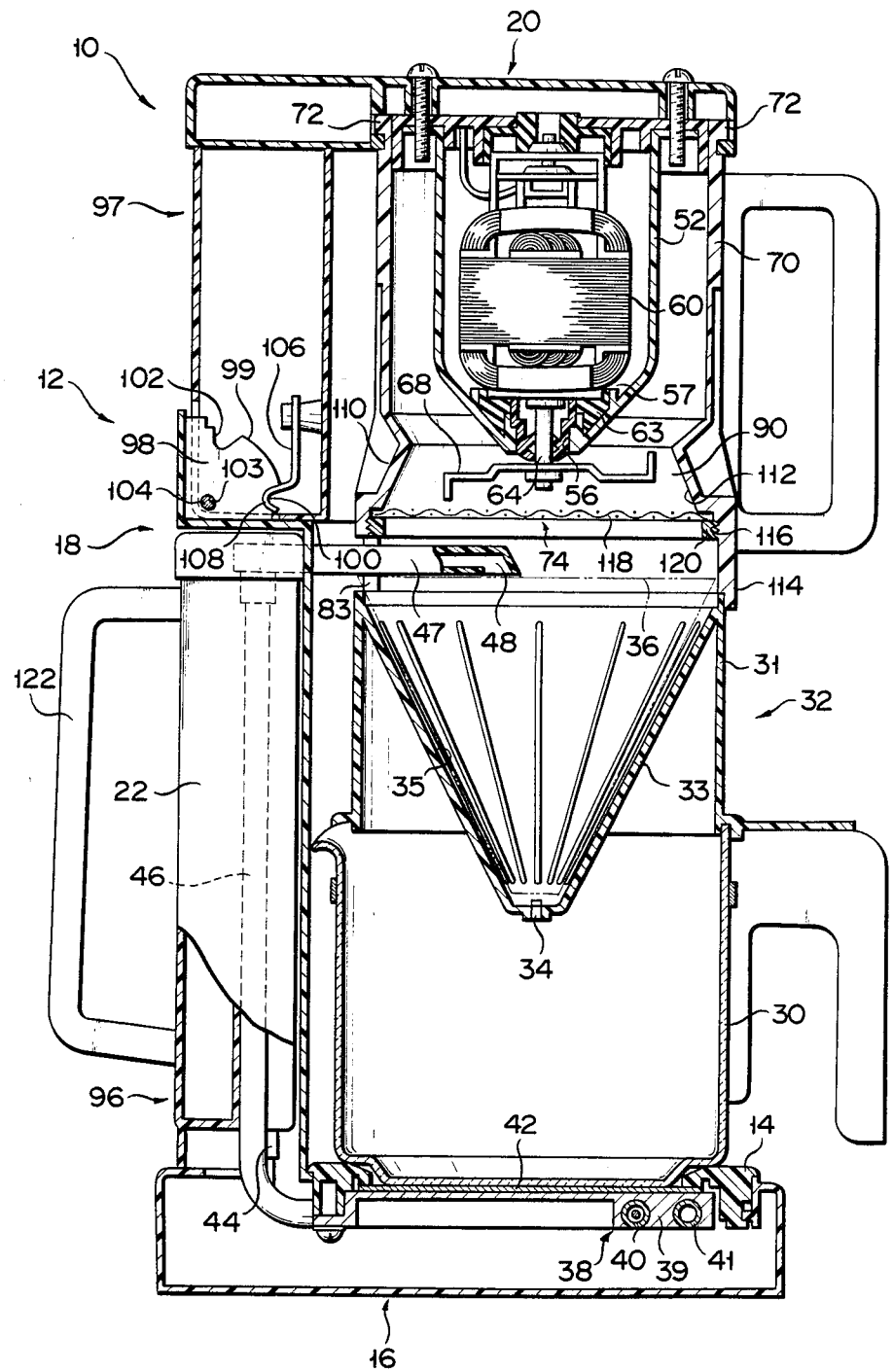

The mill case 70 has a dispensing port 74 for ground coffee defined by the lower opening thereof. A portion of the inner wall of the mill case 70 which corresponds to a portion surrounding the cutter 68 has a small diameter so as to form a small-diameter portion 110. The lower portion of the mill case 70 is tapered from the dispensing port 74 to the small-diameter portion 110 so as to form a tapered portion 112. A cylindrical filter mounting member 114 is coaxially fixed on the lower end of the mill case 70. A thread portion 116 is formed on the inner surface of the filter mounting member 114. The dispensing port 74 of the mill case 70 is closed by a net-like filter 118. The filter 118 is detachably mounted on the lower end of the mill case 70 by a ring-shaped fastening member 120 screwed into the thread portion 116. A notch 83 is formed at the filter mounting member 114 to open downward so as to receive a hot water supply arm 47 therethrough. As shown in FIG. 5, the lower end portion of the filter mounting member 114 is formed to fit the upper end portion of the filter case 32.

A water tank 22 is independent of the main body 12 and has a handle 122. The water tank 22 is detachably mounted in the first portion 96.

Figure 8:
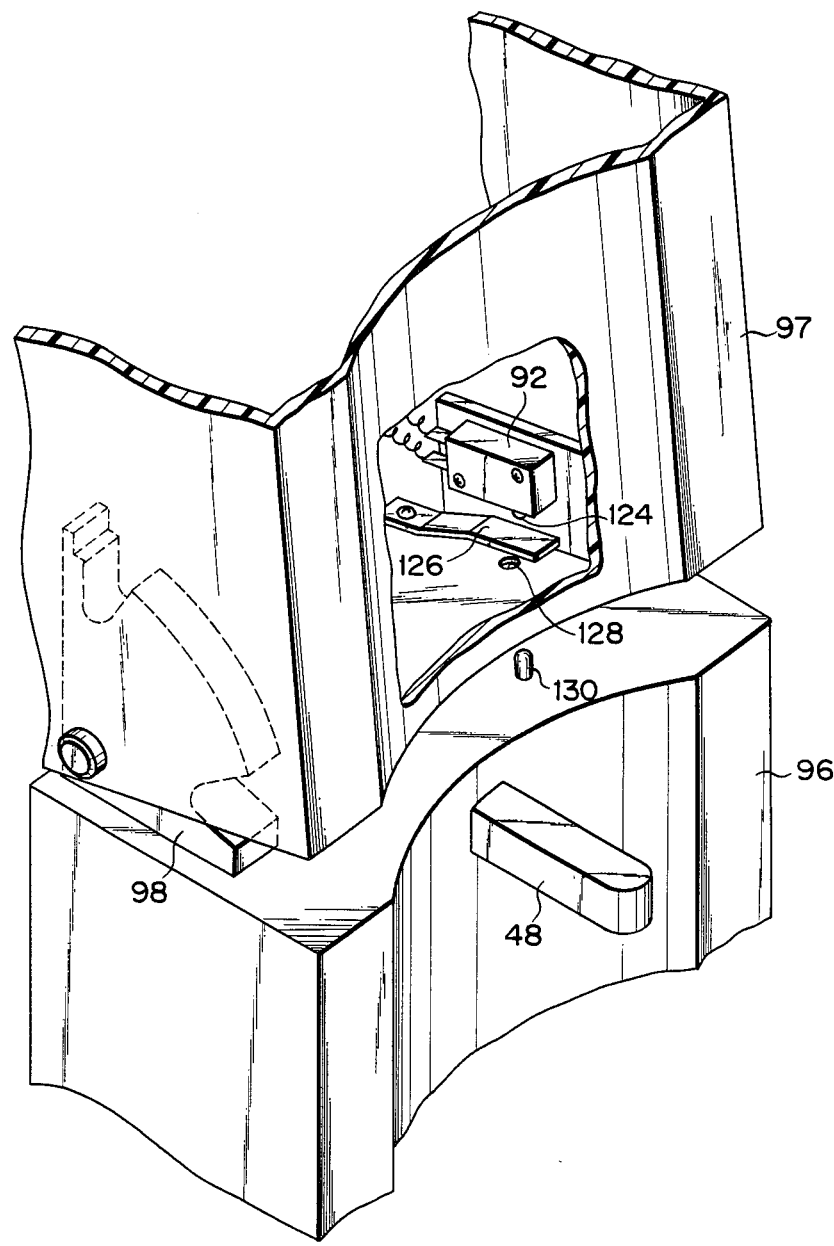

As shown in FIG. 8, a safety switch 92 is arranged at the lower portion of the second portion 97. The safety switch 92 has an operation knob 124 and a leaf spring 126 one end of which is fixed to the second portion 97 so as to oppose the operation knob 124. A through hole 128 is formed in a portion of the second portion 97 which opposes the other end of the operation knob 124. A projection 130 is formed at the upper end of the first portion 96 so as to engage the through hole 128. When the second portion 97 is set in the first position shown in FIG. 5, the projection 130 extends through the through hole 128 and into the second portion 97. The projection 130 then urges the operation knob 124 through the leaf spring 126, thereby turning on the safety switch 92. As a result, the motor 60 can be energized.

The operation of the coffee maker 10 according to the second embodiment of the present invention will be described hereinafter.

Figure 6:
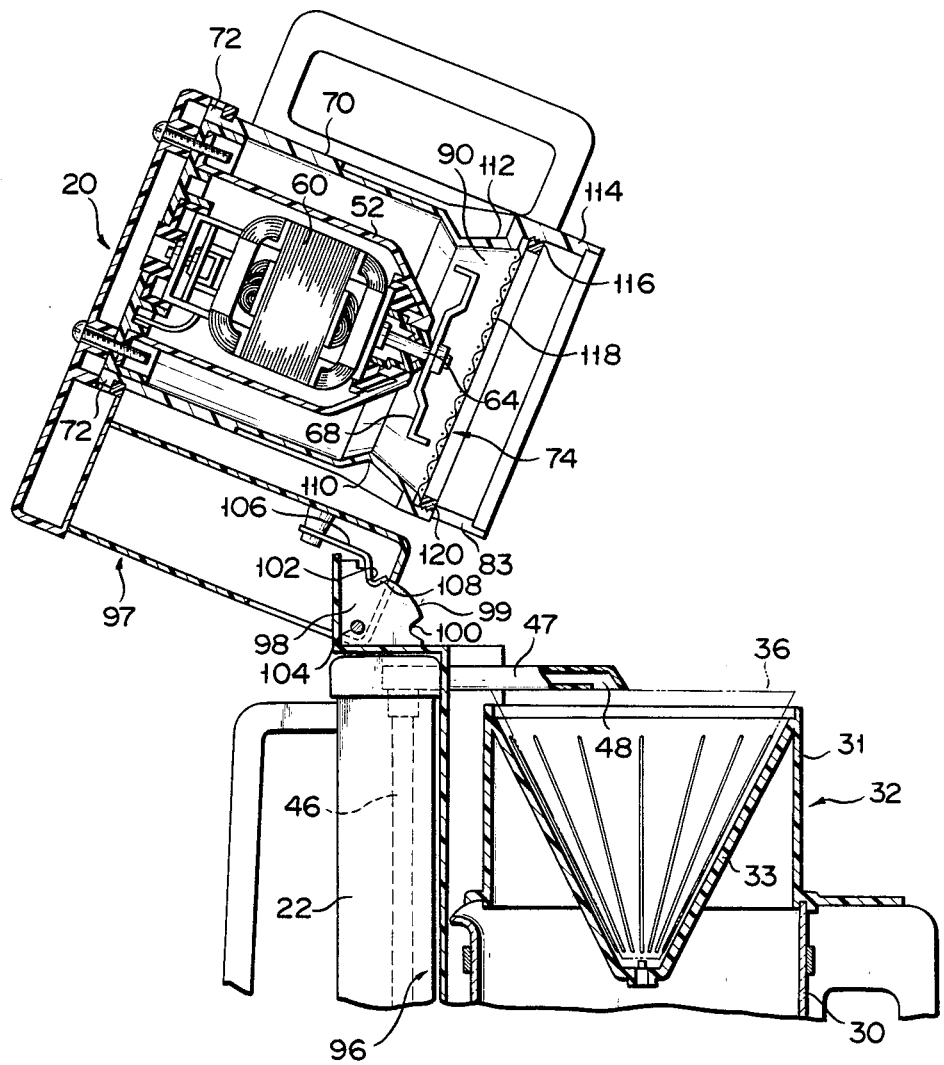
Figure 7:
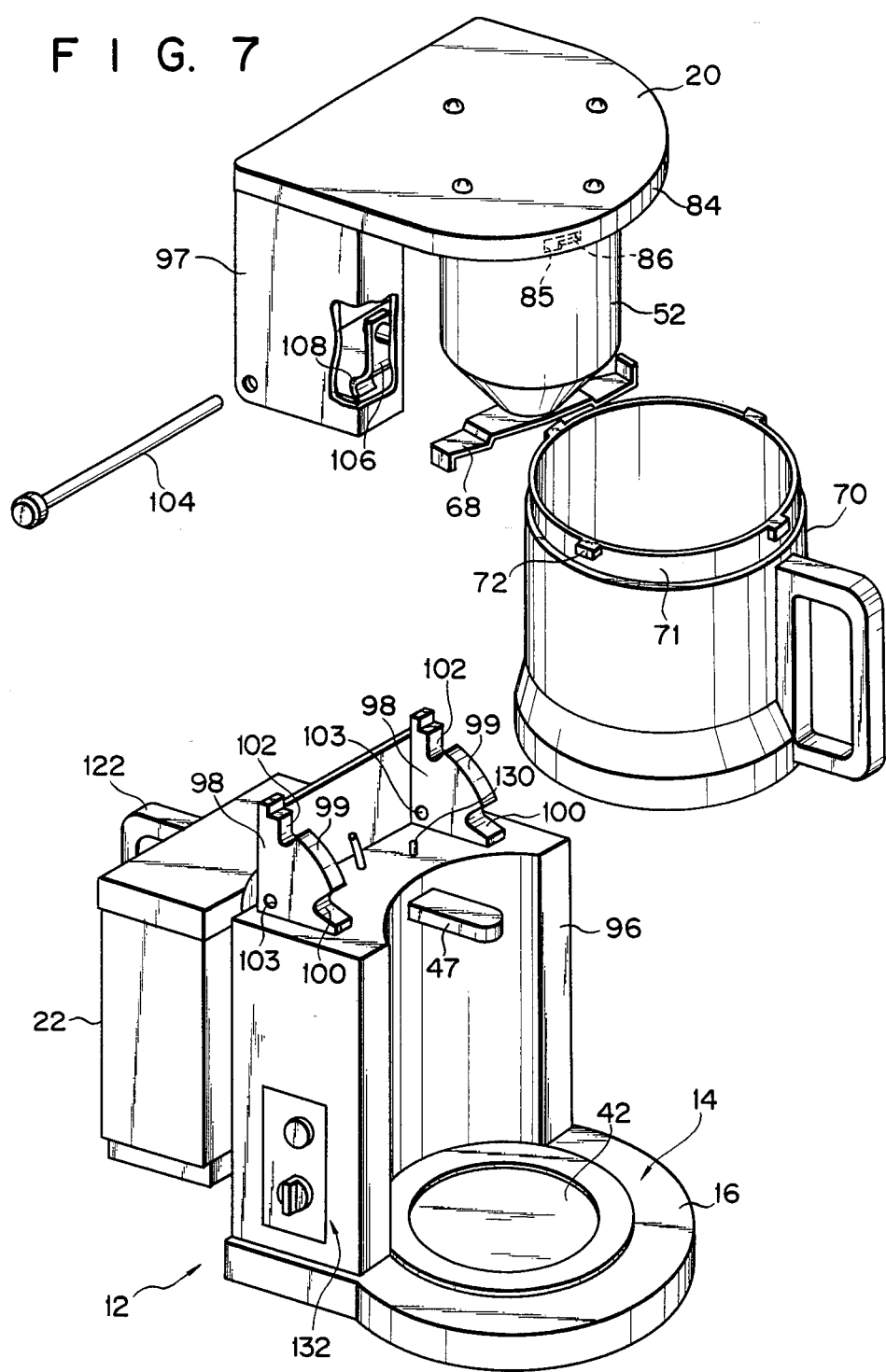

Assume that the second portion 97 of the main body 12 is set in the first position, as shown in FIG. 5. When the user wishes to make coffee, he pivots the second portion 97 together with the mill case 70 in the counterclockwise direction. The projections 108 of the leaf springs 106 engage the second engaging recesses 102 of the hinges 98, respectively. The second portion 97 is held in the second position, as shown in FIG. 6. In the second position, the second portion 97 is pivoted through a predetermined angle with respect to the first portion 96. The dispensing port 74 and the filter mounting member 114 of the mill case 70 are sufficiently spaced apart from the upper opening of the filter case 32. In this condition, the user removes the mill case 70 from the support portion 20. In the state wherein the second portion 97 is set in the second position, the safety switch 92 is kept OFF and the motor 60 cannot be energized. For these reasons, the cutter 68 cannot be accidentally rotated, thus assuring safety of operation. The user then places a desired amount of coffee beans in the mill case 70, which he has removed from the support portion 20, in accordance with the amount of coffee he wishes to make. He then mounts the mill case on the support portion 20 and pivots the second portion 97 together with the mill case 70 in the clockwise direction to set the second portion 97 in the first position. In this position, the dispensing port 74 of the mill case 70 opposes the upper opening of the filter case 32 and is adjacent thereto. The lower end of the filter mounting member 114 engages the upper end of the filter case 32. The notch 83 of the filter mounting member 114 is loosely fitted with the hot water supply arm 47. Furthermore, the operation knob 124 is pressed by the projection 130 through the leaf spring 126, so that the safety switch 92 is turned on.

The user then removes the water tank 22 from the first portion 96 of the main body 12 and pours a predetermined amount of water from a faucet (not shown) into the tank. The user mounts the water tank 22 in the first portion 96 and sets a manual switch 132 (FIG. 7) to a mill operating position to energize the motor 60. The cutter 68 is then rotated to mill the coffee beans in the mill case 70. The ground coffee is radially moved toward the peripheral portion of the mill case 70 upon rotation of the cutter 68 and abuts against the inner surface of the tapered portion 112 (the diameter of the tapered portion 112 increases toward its distal portion). The guiding action of the inner surface of the tapered portion 112 causes the ground coffee to move downward (i.e., to the dispensing port 74). The ground coffee is urged against the filter 118, and the coffee ground to a proper size drops onto a paper filter 36 in a filtration funnel 33 through the filter 118. When all the ground coffee has dropped onto the paper filter 36, hot water is supplied to the ground coffee from the hot water supplying means 38 to brew coffee therefrom.

When the coffee-making is completed, the user needs to remove the jug 30 from the jug stand 14. For this purpose, the user pivots the second portion 97 together with the mill case 70 into the second position so as to separate the filter mounting member 114 (i.e., the lower end of the mill case) from the upper opening of the filter case 32. The user then removes the jug 30 together with the filter case 32 from the jug stand 14, removes the filter case 32 from the jug 30, and serves the brewed coffee into coffee cups.

The coffee maker of the second embodiment has the following advantages in addition to the advantages of the coffee maker of the first embodiment.

First, the second portion 97 of the straight portion 18 may be pivoted between the first position where the lower end of the mill case 70 fits the upper end of the filter case 32 and the second position where the lower end of the mill case 70 is separated from the upper end of the filter case 32. In the case of removing the jug 30 together with the filter case 32 from or mounting it in the jug stand 14, the second portion 97 is set in the second position, so that the lower end of the mill case 70 is separated from the upper end of the filter case 32. As a result, the user can easily remove the jug 30 and the filter case 32 from or mount them in the jug stand 14. Furthermore, since the second portion 97 of the straight portion 18 may be pivoted with respect to the first portion 96, the lower end of the mill case 70 (i.e., the lower end of the filter mounting member 114) can fit the upper edge of the filter case 32 when the second portion is set in the first position. With this construction, the ground coffee dropping through the filter 118 will not be scattered outside the filter case 32. Furthermore, since the lower end of the mill case 70 is supported by the upper end of the filter case 32, vibration of the mill case during operation is prevented, thus decreasing noise.

In the second embodiment, the dispensing port 74 of the mill case 70 is closed by the net-like filter 118, so that the proper coffee particles (coffee ground to a proper particle size) are sequentially filtered through the filter 118 to drop on the paper filter 36. Therefore, a special operation is not required to transfer the ground coffee from the mill case 70 to the filter case 32. Furthermore, since the filter 118 is detachably mounted by the fastening member 120 on the mill case 70, a filter which has a predetermined mesh size can be used for coffee having a desired milling size. As a result, the taste and strength of the brewed coffee can be freely adjusted.

In the second embodiment, the straight portion 18 of the main body 12 is divided into first and second portions 96 and 97, and the second portion 97 can be pivoted with respect to the first portion 96. However, as shown in FIG. 9, a straight portion 18 may be integrally formed, and a support portion 20 may be vertically movable with respect to the straight portion 18. In the modification shown in FIG. 9, the straight portion 18 is integrally formed and has a pair of parallel guide grooves 134 extending vertically therealong at its upper half. The support portion 20 has a support plate 136 extending vertically downward therefrom. The support plate 136 has a pair of ribs 138 which can engage the pair of guide grooves 134. When the ribs 138 of the support plate 136 are respectively inserted in the guide grooves 134 of the straight portion 18, the support portion 20 is slidably supported together with the mill case 70 along the height of the straight portion 18. The support portion 20 may be moved between a first position where the lower portion of the mill case 70 is fitted in the upper end of the filter case 32 and a second position where the lower end of the mill case 70 is separated from the upper end of the filter case 32. In this modification, the mill case 70 can be separated from the filter case 32 when the operator removes or mounts the filter case 32 and the jug 30 in the jug stand 14. As a result, the removing and mounting operation is easily performed in the same manner as in the second embodiment.

A further modification will now be described.

Figure 10:
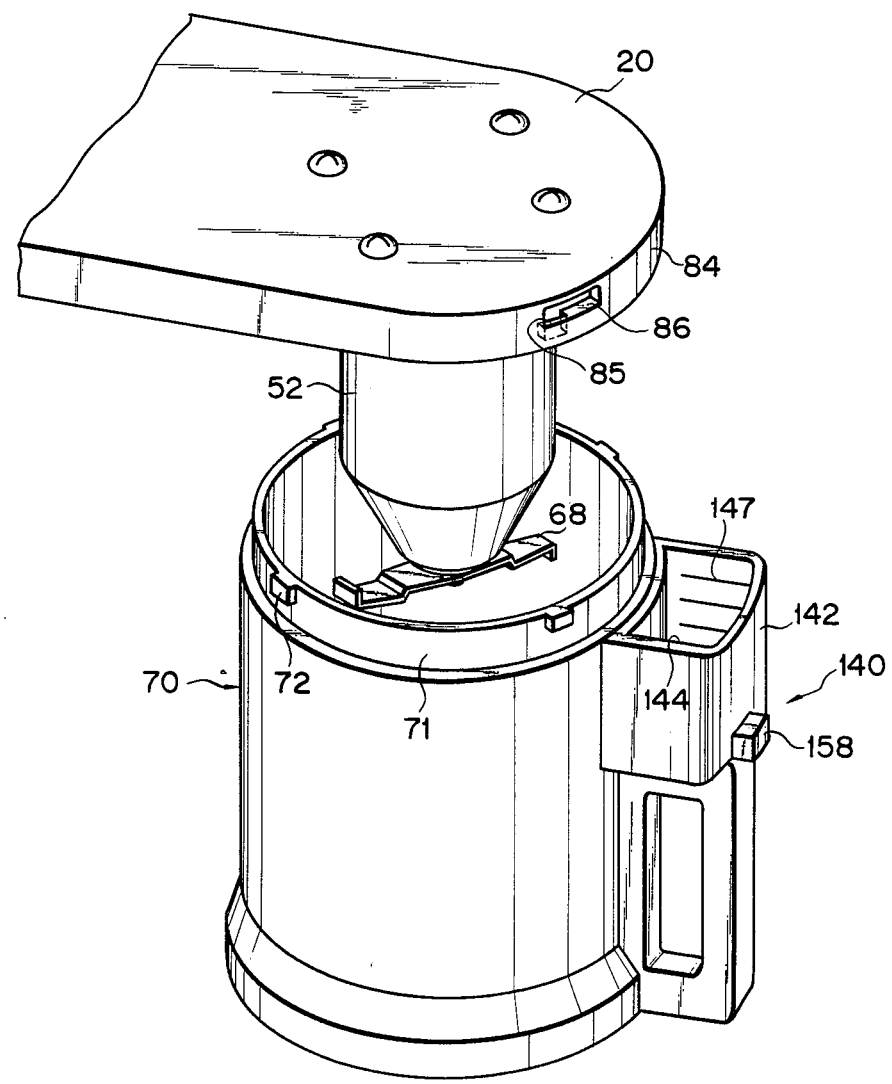
Figure 11:
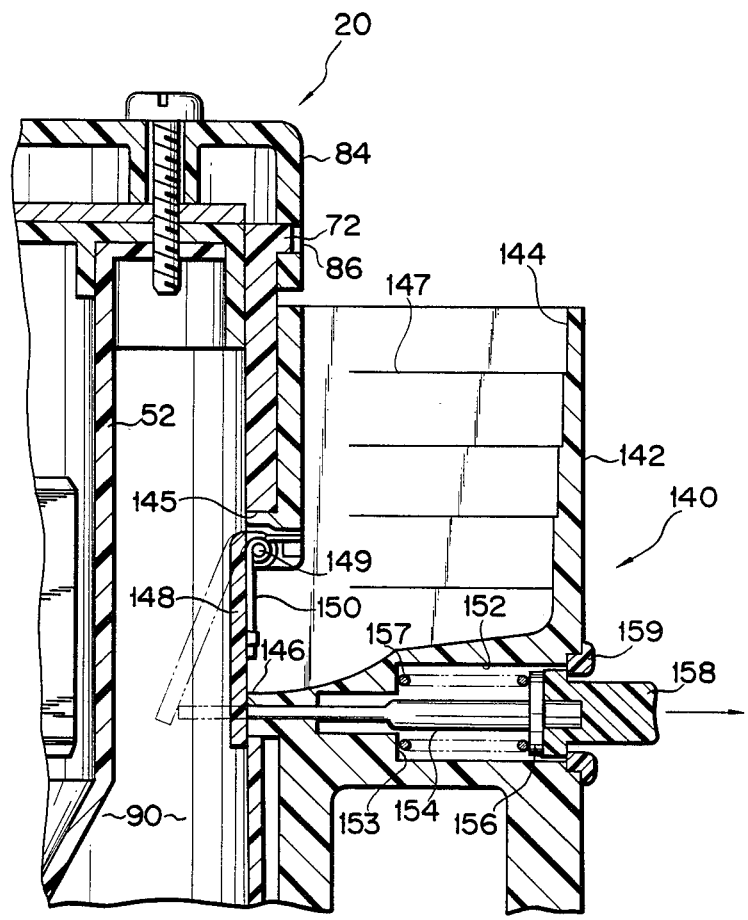

The mill case 70 may have a coffee bean feeding means 140 for feeding the coffee beans into the mill case, as shown in FIGS. 10 and 11. The coffee bean feeding means 140 includes a prism-shaped container 142 fixed on the outer surface of the upper portion of the mill case 70. This container 142 has a feed port 144 formed on the upper surface of the container 142, and a discharging port 146 communicating with the inside (i.e., the milling space 90) of the mill case 70 through an opening 145 formed in the wall of the mill case 70. A plurality of calibration steps 147 are formed on the inner wall of the container 142 to be spaced apart from each other at predetermined intervals along the height of the mill case 70. These steps serve as a scale for measuring the amount of coffee beans. The coffee bean feeding means 140 has a shutter 148 for opening/closing the discharging port 146. The shutter 148 is rotatably supported by a shaft 149 mounted on the container 142. The shutter 148 is biased counterclockwise by a torsion coil spring 150 mounted around the shaft 149, as shown in FIG. 11. The discharging port 146 is thus normally closed. A through hole 152 is formed in the lower portion of the container 142 to horizontally extend toward the inside of the mill case 70. One end of the through hole 152 is open to the inside of the mill case 70 to oppose the lower end portion of the shutter 148, and the other end thereof is open to the outside of the container 142. The portion which defines the through hole 152 has a step which corresponds to a shoulder 153. An operation rod 154 is slidably disposed in the through hole 152. One end of the operation rod 154 can extend inside the mill case 70 through one end of the through hole 152. A collar 156 is formed at the other end portion of the operation rod 154 to oppose the shoulder 153. A compression coil spring 157 is disposed in the through hole 152 between the shoulder 153 and the collar 156 to urge the operation rod 154 in a direction away from the mill case 70. A pushbutton 158 is mounted at the other end of the operation rod 154 and extends outward from the other end of the through hole 152. An annular stopper 159 is fitted at the other end of the through hole 152. The stopper 159 serves to prevent the operation rod 154 and the pushbutton 158 from emerging from the through hole 152 against the urging force of the compression coil spring 157.

When the user feeds the coffee beans in the mill case 70, he feeds the coffee beans into the container 142 from the feed port 144 while checking the amount of coffee beans against the steps 147. The user then pushes the pushbutton 158 against the urging force of the compression coil spring 157 to move the operation rod 154 toward the mill case 70. The shutter 148 is biased by the distal end of the operation rod 154 and pivots clockwise to open the discharging port 146 as indicated by the alternate long and two dot line in FIG. 11. The coffee beans in the container 142 are then fed into the mill case 70 through the port 146. When all the coffee beans are fed into the mill case 70, the user releases the pushbutton 158, so that the operation rod 154 is moved by the urging force of the compression coil spring 157 in a direction away from the mill case 70. The operation rod 154 then returns to the initial position. Along with this movement, the shutter 148 is pivoted counterclockwise by the urging force of the torsion coil spring 150 to close the port 146. Thereafter, the coffee beans are milled, and the ground coffee is then extracted. Since the port 146 is closed by the shutter 148 during the milling operation, the ground coffee will not be scattered outside the mill case 70 through the port 146.

The coffee maker of the above modification is slightly complicated as compared with that of the first embodiment. However, the coffee maker of this modification has the following advantages. The user can feed coffee beans into the mill case 70 through the port 144 while the mill case 70 is mounted on the support portion 20 of the main body 12. Therefore, the mill case 70 need not be removed from the support portion 20 in order to load the beans, thus simplifying the feeding of the beans and the operation of the coffee maker as a whole. In the first embodiment, in order to mount the mill case containing a number of coffee beans on the main body, the mill case must be squeezed, since the cutter thereof abuts against the coffee beans, which is a cumbersome mounting procedure. However, according to the above modification, since the coffee beans can be fed while the mill case is mounted on the main body, the above problem is eliminated. The container 142 also has the steps 147 which serve as a scale, so that the user can measure the amount of coffee beans in the container.

In the above modification, the container 142 is mounted on the mill case 70. However, if the user uses a separate measuring cup, the coffee beans may be directly fed from the measuring cup through the port 146, and the container 142 need not be disposed. Furthermore, if a design for preventing the scattering of the ground coffee is utilized, the shutter 148 need not be disposed.

Figure 12:
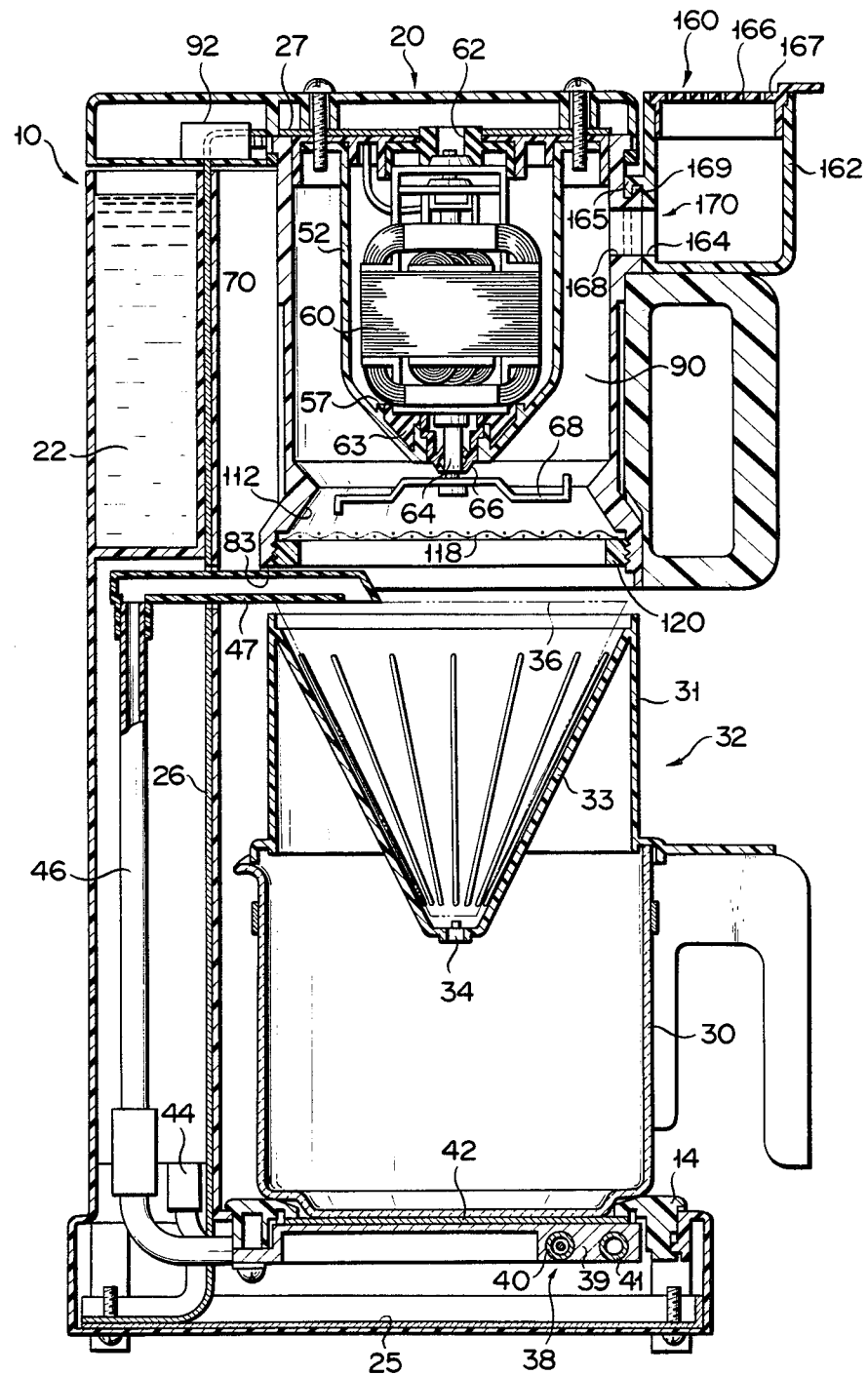
Figure 13:
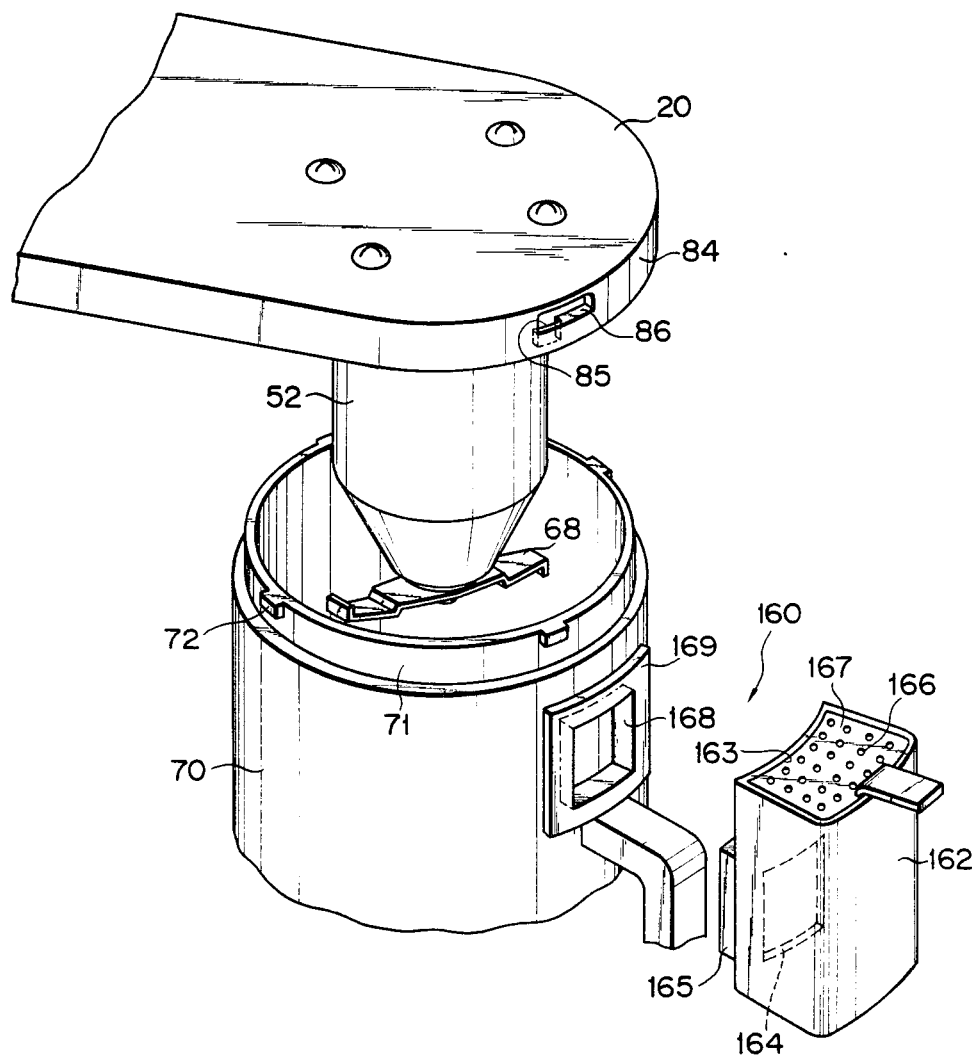

The mill case 70 may have a collecting means 160 for collecting astringent coats scattered at the time of coffee milling, as shown in FIGS. 12 and 13.

In general, an astringent coat of a coffee beans is scattered at the early stage of milling. This coat is milled together with the core of the beans, so that the ground coat is mixed in the ground coffee. As a result, the extracted coffee becomes excessively bitter. At the early stage of milling, these outer layers are scattered and float along the inner wall of the mill case. Utilizing this tendency, the outer layers can be collected in a collector disposed on a cover of the mill case. However, finely ground coffee is also collected in such a collector, thus wasting some of the ground coffee.

According to the above modification, the collecting means 160 has a collector 162 detachably mounted on the mill case 70. The collector 162 has a substantially prism-shaped housing with a bottom. The collector 162 has an outflow port 163 at its top and a rectangular opening 164 on the side wall of the lower portion thereof. A projection 165 is formed to extend outward around the opening 164 except for the lower side of the portion which defines the opening 164. A cover 167 which has a plurality of through holes 166 is attached to the outflow port 163 of the collector 162. A rectangular opening 168 is formed at the upper portion of the wall of the mill case 70. A flange 169 is formed around the opening except for a portion which defines the lower side of the opening 168. The flange 169 can engage the projection 165. The collector 162 is detachably mounted on the mill case 70 by engaging the projection 165 with the flange 169 from the upper side thereof. When the collector 162 is mounted on the mill case 70, the opening 164 of the collector communicates with the opening 168 of the mill case. The openings 164 and 168 constitute an intake port 170 for taking astringent layers, which are scattered in the milling operation, into the collector 162.

The mill case 70 has a tapered portion 112 whose diameter is decreased from the dispensing port 74 to the portion which surrounds the cutter 68 in the same manner as in the second embodiment. The dispensing port 74 is closed by a net-like filter 118 through which the coffee which has been ground to a proper particle size is allowed to pass.

When the motor 60 is energized and the coffee beans in the mill case 70 are milled by the cutter 68, the ground coffee is radially moved by rotation of the cutter 68. The ground coffee then abuts against the inner surface of the tapered portion 112 whose diameter is increased toward the dispensing port 74. The ground coffee is urged toward the filter 118 by the guiding action of the tapered inner surface. Therefore, the coffee ground to the proper particle size sequentially passes through the filter 118 and drops in the filtration funnel 33. Air in the vicinity of the upper portion above the cutter 68 circulates radially upon rotation of the cutter 68. The air then flows upward in the milling space 90 into the collector 162 through the intake port 170. The air blown in the collector 162 is discharged therefrom through the through holes 166 of the cover 167. As previously mentioned, the astringent layers are scattered when the coffee beans are milled. These layers are very light in weight and float on the air flowing upward into the collector 162. Therefore, they can be collected in the collector 162 through the intake port 170, but cannot return to the mill case through the port 170 since air is constantly blowing upward through the collector 162. As a result, the bitter layers are left in the collector 162. When all the ground coffee falls into the filtration funnel 33, the user removes the collector 162 from the mill case 70 and throws away the collected outer layers.

As described above, the mill case 70 has the collecting means 160, so that the scattered astringent layers of the coffee beans can be collected at the early stage of coffee milling. As a result, good, fresh-tasting coffee can be produced.

The coffee ground to the predetermined particle size in the mill case 70 passes through the filter 118 and drops into the filtration funnel 33. The coffee beans should not be milled to a fine powder which may be blown in the mill case 70. For this reason, the relatively large particles are left in the mill case 70 in the process of milling. These particles will not be blown upon rotation of the cutter 68. The port 170 is located at the upper portion of the mill case 70, so that the coffee particles will not be scattered or introduced into the collector 162. As a result, the ground coffee or large coffee pieces will not be introduced into the collector 162 and all the ground coffee can be used for brewing and not be wasted.

Furthermore, since the collector 162 is detachably mounted on the mill case 70, the collector can be removed from the mill case 70 before coffee brewing is performed (i.e., before hot water is supplied from the hot water supplying means 38). The collected astringent layers will thus not be exposed to heat and steam. Therefore, the bitterness and astringency of the collected layers will not soak into the coffee. The user can then make good coffee without bitterness.

Figure 14:
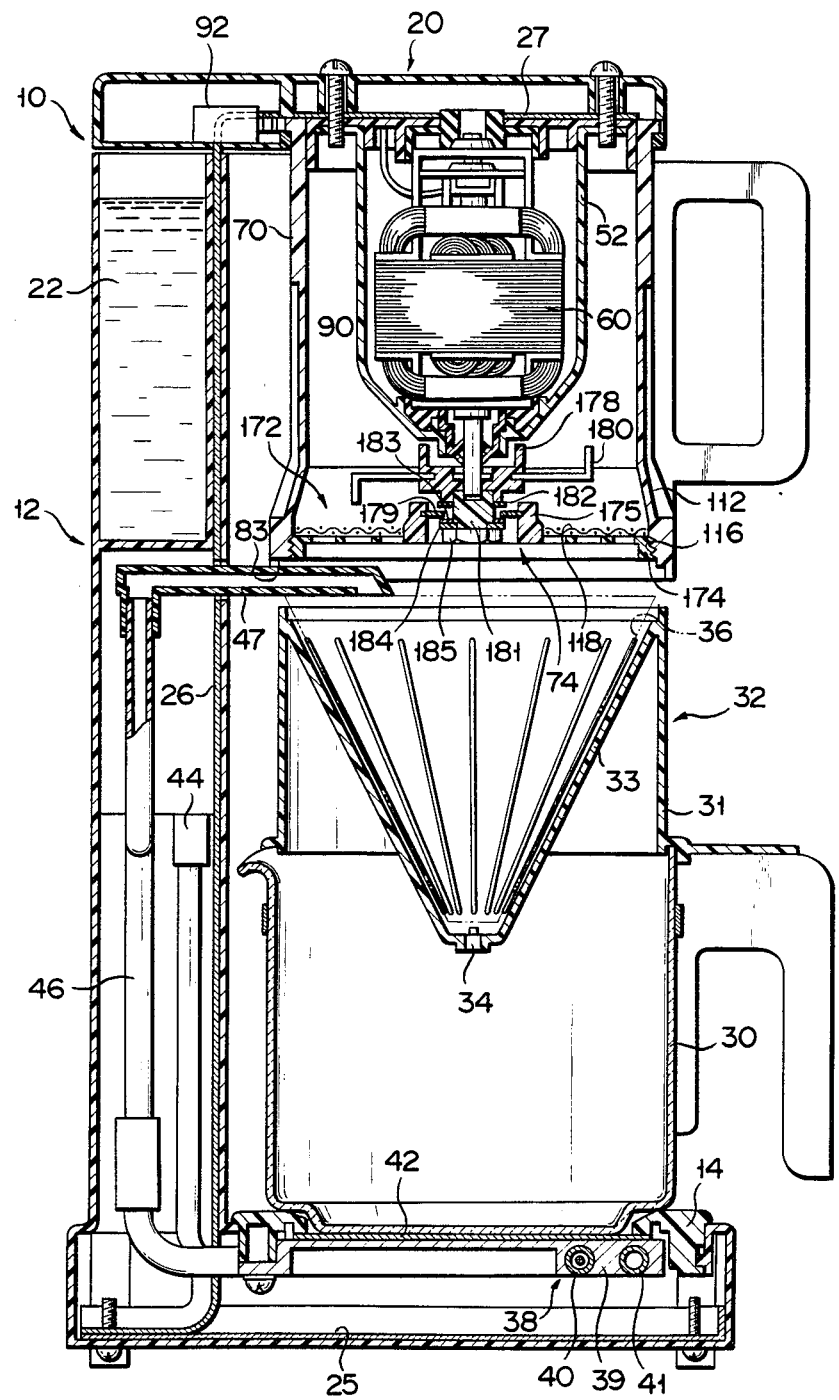

In the previous embodiment, the cutter 68 is mounted on the rotating shaft 64 of the motor 60. However, a cutter may be mounted at the bottom of the mill case 70, as shown in FIGS. 14 and 15.

In the modification immediately above, the lower opening of the mill case 70 defines the ground coffee dispensing port 74. The rough net-like filter 118 is disposed on the supply port. The filter 118 is supported by a support frame 172 which is detachably mounted at the lower end of the mill case 70. The support frame 172 has a ring-shaped outer frame 174 having a male thread portion 173 on its outer surface, a cylindrical cutter support 175 disposed to be coaxial with the outer frame 174 and a plurality of radial ribs 176 and annular ribs 177 which connect the outer frame 174 and the support 175. The members of the support frame 172 are formed integrally with each other. An annular support metal piece 179 is embedded and fixed by insert molding in the support 175 and extends inward in the support 175. The male thread portion 173 of the outer frame 174 is screwed with a female thread portion 116 formed on the inner surface of the lower portion of the mill case 70, so that the support frame 172 is mounted in the mill case 70. The filter 118 is mounted on the support frame 172 by insert molding or welding.

The cutter 68 is rotatably supported on the support 175. The cutter 68 has a cylindrical plastic boss 178 with a bottom and a pair of blades 180 embedded and fixed by insert molding in the boss 178. These blades 180 radially extend from the boss 178 to oppose each other. A metal shaft 181 is embedded and fixed in the lower end of the boss 178 and extends downward from the lower end of the boss 178. A male thread portion (not shown) is formed at the lower end portion of the shaft 181. A thrust washer 183 is inserted in the shaft 181 from its lower end, while the shaft 181 which has a thrust washer 182 fitted therearound is inserted in the support metal piece 179 from the upper end of the cutter support 175. A removal-preventive washer 184 is inserted around the male thread portion of the shaft 181 and fastened by a nut 185. As a result, the cutter 68 is firmly and rotatably mounted on the cutter support 175. A groove 186 is formed in the inner bottom surface of the boss 178. In the state where the cutter 68 is mounted on the cutter support 175, the upper end of the boss 178 is positioned at a predetermined level relative to the level of the filter 118 which corresponds to the bottom surface of the mill case 70.

A coupling pin 187 is fixed at the lower end of the rotating shaft 64 of the motor 60. The two ends of the coupling pin 187 extend radially outward from the rotating shaft 64.

As shown in FIG. 14, in the state where the mill case 70 is mounted on the support portion 20 of the main body 12, the lower end portion of the rotating shaft 64 and the coupling pin 187 are inserted in the groove 186, so that the rotating shaft is coupled with the cutter 68. In other words, the motor 60 can drive the cutter 68.

In the above modification, the user removes the mill case 70 from the support portion 20 in order to mill the coffee beans. The rotating shaft 64 and the coupling pin 187 are removed from the groove 186 of the boss 178, so that the coupling between the rotating shaft and the cutter 68 is released. The user then feeds the coffee beans into the mill case 70. In this case, the user must pay attention not to feed the coffee beans into the boss 178. The mill case 70 is then mounted on the support portion 20 to cover the motor 60. In this case, the user must insert the lower end of the rotating shaft 64 and the coupling pin 187 in the groove 186 of the boss 178 so as to couple the rotating shaft 64 to the cutter 68. Thereafter, the motor 60 is energized to rotate the cutter 68, thereby milling the coffee beans in the mill case 70.

According to the modification described above, since the cutter 68 is disposed at the bottom of the mill case 70, the coffee beans may not interfere with the operation in which the mill case containing the coffee beans is mounted on the support portion 20. Therefore, the mounting operation of the mill case 70 can be simplified. The upper end of the boss 178 is located at the predetermined level with respect to the filter 118. If a proper amount of coffee beans is contained in the mill case 70, the coffee beans may not enter the boss 178 from its upper end so as to cover the groove 186. Furthermore, since the cutter 68 is mounted at the bottom of the mill case 70, the cutter cannot be exposed even if the mill case is removed from the main body 12. When the mill case 70 is removed from the main body 12, engagement of the cutter 68 with the rotating shaft 64 is released. Accordingly, even if the motor 60 is accidentally rotated due to a malfunction, safety is guaranteed.

The present invention is not limited to the above embodiments and modifications. Various changes and modifications may be made within the spirit and scope of the present invention. For example, in the above embodiments, the motor 60 is arranged in the motor case 52. However, the motor case may be eliminated if a dustproof motor is used.

What is claimed is:

1. A coffee maker comprising:
    a main body having a base forming a jug stand, a straight portion extending vertically upwardly from said base, and a support portion extending from said straight portion and spaced apart from said base at a predetermined distance and substantially parallel to said base;
    a jug for storing brewed coffee placed on said jug stand, said jug having substantially a cylindrical shape with bottom and top ends and a bottom wall at said bottom end;
    an extractor placed over said jug and having an extractor main body of a substantially cylindrical shape with an upper and lower end and formed with an opening at said upper end thereof, said lower end of said extractor main body being supported on said top end of said jug;
    a mill case for storing coffee beans having a substantially cylindrical shape with a first and second end, said first end being detachably mounted on said support portion and said second end being adjacent to and opposing said opening of said extractor main body;
    a motor mounted on said support portion and housed in said mill case to define a milling space with the inner surface of said mill case;
    a cutter arranged in said milling space and driven by said motor to grind coffee beans in said mill case, said mill case having a dispensing port facing said extractor through which the coffee ground in said mill case is supplied to said extractor;
    a tank for storing water mounted in said main body; and
    hot water supply means, disposed in said main body, for heating water in said water tank and for supplying hot water to said extractor,
    wherein said mill case, said extractor and said jug are vertically aligned to be coaxial with each other; and wherein said mill case and said support portion have mounting means for detachably mounting said first end of said mill case on said support portion, said mounting means having a plurality of projections formed on the outer surface at said first end portion of said mill case to be spaced apart from each other, and a plurality of elongated holes which respectively engage said plurality of projections.

2. A coffee maker according to claim 1, wherein said mill case has a bottom plate which closes said second end thereof, said dispensing port being formed in said bottom plate, and said mill case has opening/closing means for opening/closing said dispensing port.

3. A coffee maker according to claim 2, wherein said motor has a rotating shaft coaxial with said mill case and extending to the vicinity of said second end of said mill case, said cutter being mounted on the extended end of said rotating shaft.

4. A coffee maker according to claim 3, wherein said extractor has a filtration funnel extending from the edge of said upper end of the extractor main body into said jug, and a paper filter detachably placed in said filtration funnel, said filtration funnel having an extraction port formed at the extended end thereof.

5. A coffee maker according to claim 4, wherein said hot water supply means includes a heating place disposed in said base of said main body; a heat conduction plate disposed to be in tight contact with said heating plate and to form a bottom surface of said jug stand; a heating tube disposed in said heating plate, said heating tube having an entrance end connected to said water tank; a hot water supply tube connected to the exit end of said heating tube and extending upward through said straight portion; a hot water supply arm extending from the extended end of said hot water supply tube to above said opening of said exterior main body through said main body, said hot water supply arm having a hot water supply port opening at said opening of said extractor main body; and a sheath heater embedded in said heating plate to be parallel to said heating tube, said sheath heater being adapted to heat said jug through said heating plate and said heat conduction plate and to heat water flowing in said heating tube from said water tank, whereby hot water in said heating tube flows by boiling pressure through said hot water supply tube and said hot water supply arm and drips in said filtration funnel through said hot water supply port.

6. A coffee maker according to claim 2, wherein said opening/closing means includes a disc-shaped rotary plate rotatably mounted on said bottom plate to oppose said bottom plate and to be adjacent thereto; a lever for pivoting said rotary plate, extending outward from a periphery of said rotary plate; and a through hole formed in said rotary plate for opposing said dispensing port upon movement of said rotary plate.

7. A coffee maker according to claim 1, wherein said dispensing port is defined by a peripheral portion of said second end of said mill case, and said mill case has a filter detachably mounted on said second end of said mill case to close said dispensing port, said filter being adapted to filter the ground coffee having a predetermined particle size.

8. A coffee maker according to claim 7, wherein said motor has a rotating shaft coaxial with said mill case and extending to the vicinity of said dispensing port, said cutter being mounted on the extended end of the rotating shaft.

9. A coffee maker according to claim 8, wherein said mill case has a tapered portion which is gradually decreased from a portion of said mill case which corresponds to said dispensing port to another portion of said mill case which surrounds said cutter.

10. A coffee maker according to claim 9, wherein said mill case has collecting means for collecting astringent layers of coffee beans which are scattered when the coffee beans are milled.

11. A coffee maker according to claim 10, wherein said collecting means has a collector detachably mounted on an outer surface portion at said first end of said mill case and an intake port formed in said outer surface portion at said first end of said mill case so as to communicate the interior of said mill case with said collector, said collector having an outflow port, and a cover closing said outflow port and having a plurality of through holes.

12. A coffee maker according to claim 1, further including feeding means for feeding coffee beans through the upper portion of the wall of said mill case.

13. A coffee maker according to claim 12, wherein said feeding means includes a coffee bean container mounted on an outer surface of said mill case, said coffee beam container having a feed port for feeding coffee beans into said coffee bean container, and a discharging port which communicates with said interior of said mill case; a shutter pivotally mounted in said coffee bean container to open/close said discharging port; a biasing member for biasing said shutter to close said discharging port; and an operation member disposed to pivot said shutter against a biasing force of said biasing member by an operation external to said mill case.

14. A coffee maker according to claim 13, wherein said coffee bean container has a plurality of calibration steps which are formed on the inner surface of said container to be spaced from each other at predetermined intervals and which serve as a scale for measuring an amount of coffee beans.

15. A coffee maker according to claim 1, wherein:
said dispensing port is defined by a peripheral portion of said second end of said mill case;
said mill case has a support frame detachably mounted at said second end thereof and having a support located substantially at a center of said dispensing port, and a filter mounted on said support frame to close said dispensing port and to filter the ground coffee having a predetermined particle size therethrough;
said cutter has a boss rotatably mounted on said support of said support frame to extend from said support frame to the interior of said mill case, cutter blades extending from said boss along a radial direction of said mill case, and a groove formed in said boss; and
said motor has a rotating shaft coaxial with said mill case and extending to the vicinity of said dispensing port, and a coupling pin mounted on the extended end of said rotating shaft and radially extending outward from said rotating shaft, said extended end of said rotating shaft and said coupling pin being detachably engaged in said groove.

16. A coffee maker according to claim 1, wherein said straight portion is divided into a first portion extending upward from said base and a second portion supporting said support portion, said second portion being supported by said first portion to pivot between a first position where said second end of said mill case is adjacent to and opposes said upper end of said extractor main body and a second position where said second end of said mill case is separated from said upper end of said extractor main body, and said straight portion has retaining means for retaining said second portion in one of said first and second positions.

17. A coffee maker according to claim 16, wherein said mill case has a cylindrical filter mounting portion coaxially mounted at said second end of said mill case to engage said upper end of said extractor main body in said first position.

18. A coffee maker according to claim 1, wherein said support portion is slidably mounted on said straight portion along an axial direction of said mill case between a first position where said second end of said mill case is adjacent to and opposes said upper end of said extractor main body and a second position where said second end of said mill case is separated from said upper end of said extractor main body.

19. A coffee maker according to claim 1, further including substantially cylindrical motor case mounted on said support portion to cover said motor and disposed coaxially within said mill case, and elastic members disposed between said motor and said support portion and between said motor and said motor case to elastically hold said motor in said motor case, and wherein said milling space is defined by an outer surface of said motor case and said inner surface of said mill case, and said motor has a rotating shaft coaxial with said mill case and extending to the vicinity of said second end of said mill case through said motor case.

20. A coffee maker according to claim 1, further including a safety switch connected in series with said motor to energize said motor only when said mill case is mounted on said support portion and said second end of said mill case is adjacent to and opposes said upper end of said extractor main body.

21. A coffee maker comprising:
a main body having a base forming a jug stand, a straight portion extending vertically upwardly from said base, said straight portion is divided into a first portion extending upward from said base and a second portion, said second portion being supported by said first portion to be pivotable, a support portion extending from said second portion and spaced apart from said base at a predetermined distance and substantially parallel to said base;
a jug for storing brewed coffee placed on said jug stand;
an extractor placed over said jug;
a mill case for storing coffee beans detachably mounted on said support portion above said extractor;
a motor mounted on said support portion and housed in said mill case to define a milling space with the inner surface of said mill case;
a cutter arranged in said milling space and driven by said motor to grind coffee beans in said mill case, said mill case having a dispensing port facing said extractor through which the coffee ground in said mill case is supplied to said extractor;

a tank for storing water mounted in said main body; and hot water supply means, disposed in said main body, for heating water in said water tank and for supplying hot water to said extractor;

and wherein said second portion being pivotable between a first position where said dispensing port of said mill case is adjacent to and opposes said extractor and a second position where said dispensing port is separated from said extractor.

* * * * *